United States Patent [19]

Thomas et al.

[11] Patent Number: 5,671,259
[45] Date of Patent: Sep. 23, 1997

[54] CLOCK RECOVERY CIRCUIT

[75] Inventors: Robert McLaren Thomas, Nepean; John Staal Nielsen, Ottawa, both of Canada

[73] Assignee: Northern Telecom Limited, Montreal, Canada

[21] Appl. No.: 519,010

[22] Filed: Aug. 24, 1995

[51] Int. Cl.⁶ .................................................. H04L 7/00
[52] U.S. Cl. ........................ 375/371; 375/354; 327/165; 370/516
[58] Field of Search .................................. 375/371, 354; 370/516; 327/165, 141, 161

[56] References Cited

U.S. PATENT DOCUMENTS

| | | | |
|---|---|---|---|
| 4,615,041 | 9/1986 | Koskinen | 375/373 |
| 4,635,277 | 1/1987 | Blake et al. | 375/373 |
| 4,959,846 | 9/1990 | Apple et al. | 375/371 |
| 4,996,444 | 2/1991 | Thomas et al. | 307/269 |
| 5,007,070 | 4/1991 | Chao et al. | 375/371 |

*Primary Examiner*—Temesghen Ghebretinsae
*Attorney, Agent, or Firm*—George MacGregor; Dallas F. Smith

[57] ABSTRACT

A clock recovery circuit includes a resonant circuit which has a varactor diode and is driven into oscillation at a variable frequency in response to a control voltage fed to the varactor diode. Basically, the resonant circuit is tuned into the clock frequency of an incoming binary data signal. The clock recovery circuit provides a clock signal which is associated with a data output signal. The desired transition timing of the clock signal is at mid-point of the incoming binary data signal. When the transition timing is advanced or delayed from the mid-point due to changes in the resonant frequency of the circuit, the control voltage changes, with the result that the tuning frequency of the resonant circuit is varied. In response to the change of the resonant frequency, the transition timing of the clock output signal is delayed or advanced. This condition is detected and the control voltage fed to the varactor is changed, resulting in achievement of correct transition timing. Use of digital rather than analog integration in the control loop ensures that the adjustment will not be lost during periods in which no incoming signal is present.

8 Claims, 5 Drawing Sheets

CLOCK RECOVERY CIRCUIT

TECHNICAL FIELD

The present invention relates to a clock recovery circuit and in particular, to a clock recovery circuit for reproducing a continuous clock from a digital data signal by using a resonant circuit.

BACKGROUND ART

It is well known to provide a clock recovery circuit for producing, from an incoming digital data signal, for example, in a digital transmission system, a clock signal which is used for timing purposes in processing the data signal. Typically, the data signal is a serial binary signal having binary 1s and 0s represented respectively by the presence and absence of a positive voltage, and the clock signal is produced at the bit rate of the data signal. Such a clock recovery circuit may, for example, comprise a resonant circuit, which is superior in some applications to the well-known phase-locked loop circuit, because of faster achievement of the proper frequency and phase. The resonant circuit, which oscillates at the frequency of the clock signal, and from which the clock signal is derived, is driven by the transitions in the data signal.

U.S. Pat. No. 4,996,444 granted to R. M. Thomas et al on Feb. 26, 1991 discloses a clock recovery circuit using a resonant circuit to facilitate clock recovery from data which may contain relatively long sequences of zeroes and relatively long sequences of ones.

For timing purposes in processing the data signal, it is required that a clock recovery circuit reproduces a clock signal timed to fall in the data eye, preferably at the mid-point of the data eye.

SUMMARY OF THE INVENTION

It is an object of the present invention to provide a clock recovery circuit in which the clock used in the extracting of data is timed to fall in the data eye.

According to one aspect of the present invention, there is provided a clock recovery circuit for recovering clock from an incoming signal in which binary data bits are clocked at a clock signal, the clock recovery circuit comprising: means for providing a digital signal in response to the incoming signal, the frequency of digital signal being the clock frequency; a resonant circuit for oscillation at a variable frequency in response to the digital signal; output means, coupled to the resonant circuit for deriving a clock output signal from the resonant circuit; and control means for controlling the oscillation frequency of the resonant circuit, thereby making the oscillation frequency higher or lower in a case where the clock output signal is delayed or advanced with reference to a desired timing.

The clock recovery circuit provides a clock output signal, the transition timing of which is at a desired timing of the binary data. When the transition timing is advanced or delayed from the desired timing due to incorrect tuning of the resonant circuit, which may be the result of temperature change or aging, the oscillation frequency of the resonant circuit is variably controlled and the oscillation frequency is made lower or higher. In response to the frequency change, the timing of the clock output signal is delayed or advanced and the desired timing is provided.

In an example of the clock recovery circuit, the resonant circuit includes an inductance element and a capacitance variable element, the capacitance of which is varied in response to an input voltage. The variance of the capacitance causes a variation of the oscillation frequency of the resonant circuit.

The clock recovery circuit may include means for generating a control voltage in response to clock counts. The means for generating a control voltage may include means for maintaining the control voltage, so that correct adjustment, once achieved, is maintained in a case of no incoming signal.

BRIEF DESCRIPTION OF THE DRAWINGS

An embodiment of the present invention will now be described by way of example with reference to the accompanying drawings in which.

DETAILED DESCRIPTION

I. Structure of the Embodiment Clock Recovery Circuit

Figure 1:
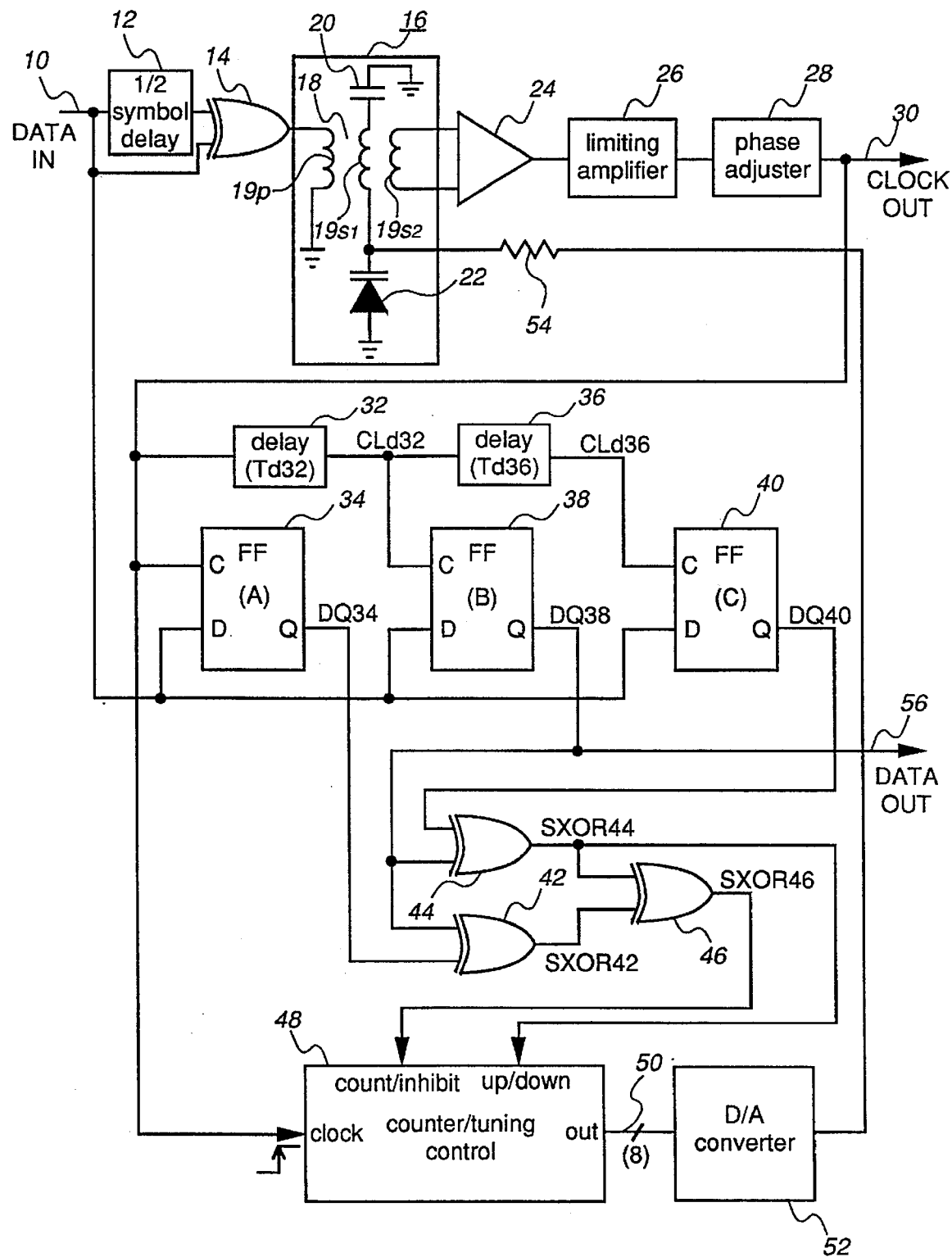
FIG. 1 is a circuit diagram of an embodiment of a clock recovery circuit according to the present invention.

The structure of the embodiment will now be described. Referring to FIG. 1, an incoming data line 10 is connected via a half symbol delay circuit 12 and directly to the input terminals of an Exclusive OR gate 14, the output terminal of which is connected to a resonant circuit 16. The resonant circuit 16 includes an inductor 18 having a primary winding 19p and two secondary windings 19s1 and 19s2, a capacitor 20 and a varactor diode 22. The primary winding 19p is connected between the output terminal of the Exclusive OR gate 14 and the ground terminal. Both terminals of the secondary winding 19s1 are connected to the ground terminal via the capacitor 20 and the varactor diode 22, respectively. The secondary winding 19s2 is connected to the input terminals of a buffer 24. Typically, the windings of the inductor 18 are loosely coupled so that resonant oscillations will not be damped significantly. The output terminal of the buffer 24 is connected to the input terminal of a limiting amplifier 26, the output terminal of which is connected to the input terminal of a phase adjuster 28. The output terminal of the phase adjuster 28 is connected to a clock output line 30 on which a recovered clock signal is provided.

The clock output line 30 is connected to the input terminal of a delay circuit 32 and the clock input terminal C of a D flip-flop 34. The output terminal of the delay circuit 32 is connected to the input terminal of another delay circuit 36 and the clock input terminal C of a D flip-flop 38. The delay circuits 32 and 36 are formed by NAND gates, for example, which introduce delay times Td32 and Td36, respectively. The delay circuits 32 and 36 provided delayed clock signals CLd32 and CLd36, respectively. The output terminal of the delay circuit 36 is connected to the clock input terminal C of a D flip-flop 40. The incoming data line 10 is connected to the data input terminals D of the three D flip-flops 34, 38 and 40. The D flip-flops 34, 38 and 40 provides from their output terminals Q delayed binary data output signals DQ34, DQ38 and DQ40, respectively.

The output terminals Q of the D flip-flops 34 and 38 are connected to two input terminals of an Exclusive OR gate 42. The output terminals Q of the D flip-flops 38 and 40 are connected to two input terminals of an Exclusive OR gate 44. The output terminals of the Exclusive OR gates 42 and 44 are connected to two input terminals of an Exclusive OR gate 46, the output terminal of which is connected to the count/inhibit terminal of a counter/tuning control circuit 48 which is a 20-bit up and down counter. The output terminal of the Exclusive OR gate 44 is also connected to the up/down terminal of the counter/tuning control circuit 48. The Exclusive OR gate 42 provides an exclusive OR signal SXOR42 of the delayed binary data output signals DQ34 and DQ38. The Exclusive OR gate 44 provides an exclusive OR signal SXOR44 of the delayed binary data output signals DQ38 and DQ40. The Exclusive OR gate 46 provides an exclusive OR signal SXOR46 of the signals SXOR42 and SXOR44.

The clock output line 30 is also connected to the clock input terminal of the counter/tuning control circuit 48. The output terminals of the counter/tuning control circuit 48 are connected to the input terminals of a digital-analog (D/A) converter 52 via an 8-bit bus 50. The counter/tuning control circuit 48 provides the 8 most significant bits of its output data to the 8-bit bus 50. The output terminal of the D/A converter 52 is connected to the junction of the varactor diode 22 and the secondary winding 19$s$1 of the inductor 18 via a resistor 54. The output terminal Q of the D flip-flop 38 is connected to a data output line 56. The delayed binary data output signal DQ38 is a data output signal of the clock recovery circuit and is present on the data output line 56. The delayed clock signal CLd32 is associated with the data output signal.

II. Operation of the Embodiment Clock Recovery Circuit

Operation of the embodiment will now be described. An incoming data signal on the incoming data line 10 is a serial bit stream form in which binary 1s are represented by positive voltage and binary 0s are represented by the absence of voltage in respective bit periods. The half symbol delay circuit 12 delays the incoming data signal by a time equivalent to a half bit period. When a transition from 1 to 0 or 0 to 1 occurs, the Exclusive OR gate 14 produces a "1" pulse lasting approximately ½ bit period. The resonant circuit 16 is tuned to the clock frequency which is generally equal to the bit rate of the incoming data signal. The resonant circuit 16 is driven into oscillation by the binary 1 pulses, and its Q is sufficiently high to sustain oscillation during moderately long periods during which no data transitions occur. The buffer 24 has a high input impedance to provide low damping for the resonant circuit 16, and the limiting amplifier 26 converts the substantially sinusoidal output signal of the buffer 24 into a substantially square waveform. The phase adjuster 28 provides a desired phase delay for general synchronism of the recovered clock signal on the clock output line 30 to the incoming data signal on the incoming data line 10.

Figure 2:
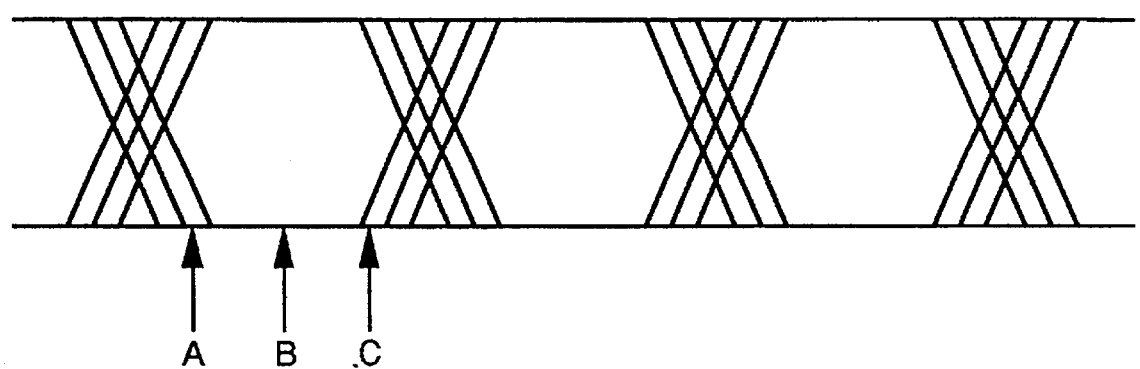
FIG. 2 is a diagram of an eye closure of an incoming data signal.

The tuning frequency of the resonant circuit 16 is determined by parameters (i.e., inductance and capacitance) thereof. The actual capacitance of the varactor diode 22 is varied dependent upon the voltage of the variable voltage signal from the D/A converter 52. The desired condition is that the rising edge of the delayed clock signal CLd32 is the mid-timing point of one symbol of the incoming data. The desired timing is "B" as shown in FIG. 2, timing B being the mid-point of the data eye in time. The desired timing B is achieved by the phase adjuster 28 and the delay circuit 32, so that the extracting timing of the D flip-flop 38 is timing B. The delay times Td32 and Td36 of the delay circuits 32 and 36 are selected to be about a quarter bit period and so that the timings of the D flip-flops 34 and 40 are a quarter bit advanced and delayed than timing B. The advanced and delayed timings are shown as "A" and "C" in FIG. 2.

Because of aging of the clock recovery circuit, the resonant frequency of the resonant circuit 16 changes, with the result that a static phase shift occurs, causing the recovered clock signal to move to one side or the other of the data eye in timing. Also, the free-running period of the resonant circuit 16 changes. If the incoming data signal on the incoming data line 10 contains a sequence of consecutive binary 0s or 1s, the recovered clock signal will move progressively to one side of the data eye or the other, causing clock jitter.

When the logic state of the input signal fed to the count/inhibit terminal of the counter/tuning control circuit 48 is "low", it is prevented from counting the clock pulses. When the logic state of the input signal fed to the count/inhibit terminal is "high", the counter/tuning control circuit 48 is enabled to count. It counts up or down in a case where the logic state at the up/down terminal is "high" or "low", respectively. The counter/tuning control circuit 48 counts up or down by one count on the rising edge of each clock pulse fed to its clock input terminal. In the absence of clock pulses (as occurs when no data signal is present), the counter does not change state.

Figure 3:
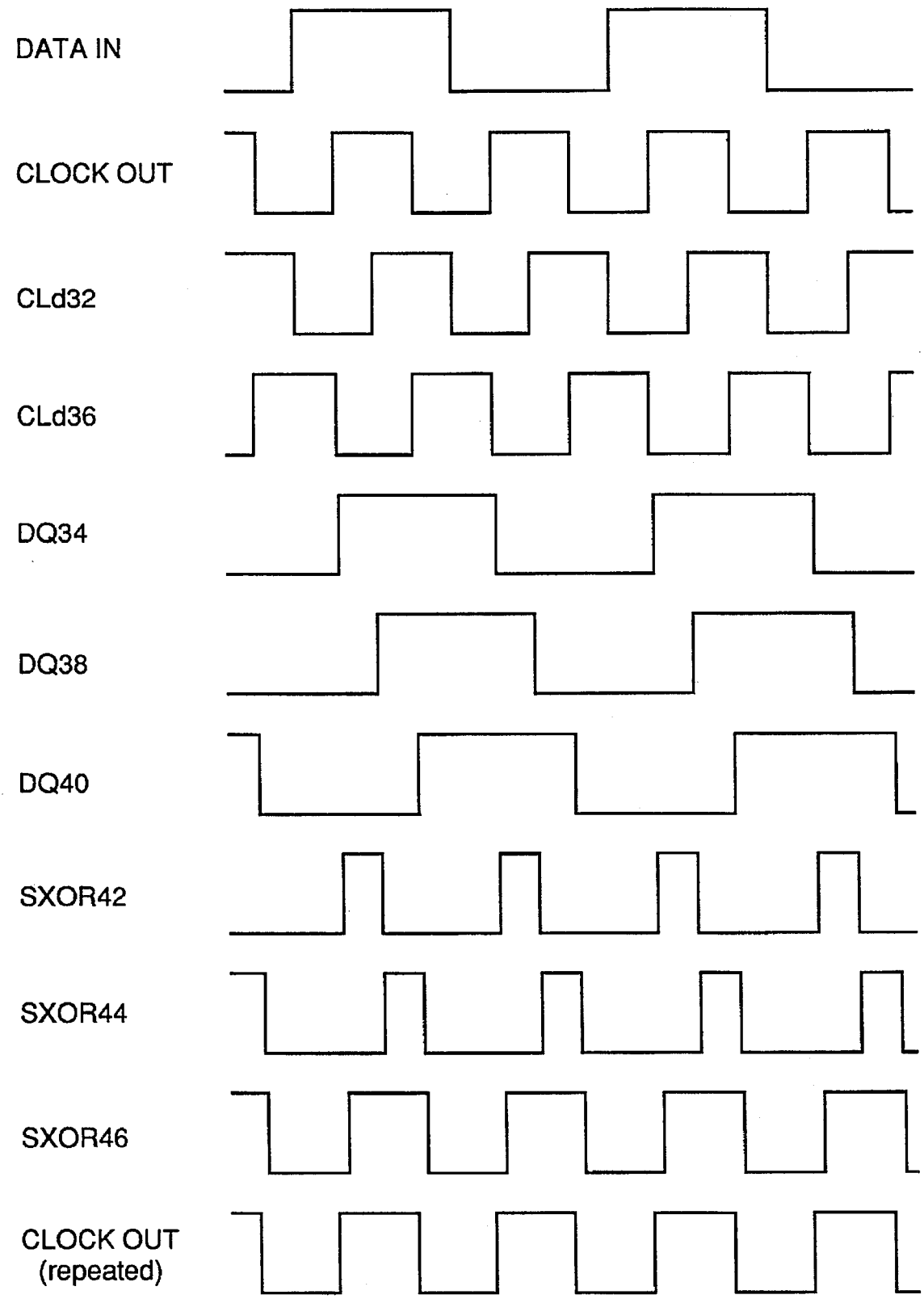
FIG. 3 is a timing chart which illustrates operation of the clock recovery circuit in a case where the clock is extracted at a desired timing.

FIG. 3 is a timing chart which illustrates operation of the clock recovery circuit in a case where the clock is extracted at the desired timing (the mid-point of the data eye). In this case, the extracting timing is not required to be varied. Because the logic state of the signal fed from the exclusive OR gate 46 to the count/inhibit control terminal of the counter/tuning control circuit 48 is "low" at the rising edge of the recovered clock signal pulses, the circuit 48 is prevented from counting, with the result that the output signal from the circuit 48 to the D/A converter 52 remains the same. Hence, the voltage of the variable voltage signal fed by the D/A converter 52 remains the same voltage, with the result that the capacitance of the varactor diode 22 is not varied and the resonance frequency of the resonant circuit 16 is not varied, either.

Figure 4:
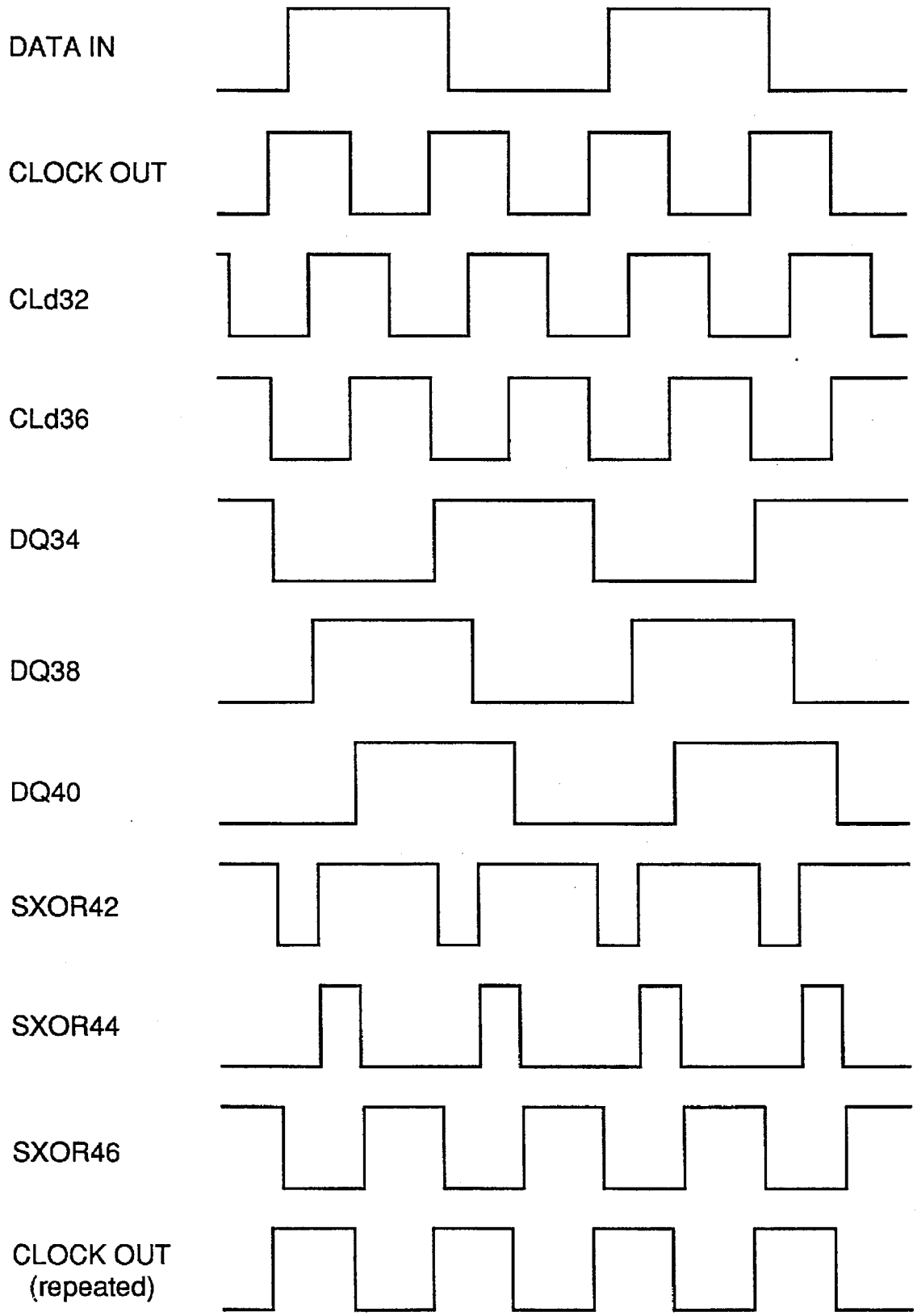
FIG. 4 is a timing chart which illustrates operation of the clock recovery circuit in a case where the clock is extracted at an advanced timing.

FIG. 4 is a timing chart which illustrates operation of the clock recovery circuit in a case where the clock is extracted at the advanced timing. In this case, the rising edge of the recovered clock signal is earlier than the center of the eye, similar to timing A shown in FIG. 2 and the extracting timing must be postponed. Because the logic state of the signal SXOR46 fed from the Exclusive OR gate 46 to the count/inhibit control terminal of the counter/tuning control circuit 48 is "high" at the rising edge of the recovered clock signal pulses, the circuit 48 is allowed to count the recovered clock signal pulses. Because the logic state of the signal SXOR44 fed from the Exclusive OR gate 44 to the up/down control terminal of the counter/tuning control circuit 48 is "low" at the rising edge of the recovered clock signal pulses, the circuit 48 acts as a down counter, so that the count is decreased. In response to the decrease in the count, the D/A converter 52 produces a lower output voltage, with the result that the capacitance of the varactor diode 22 is increased and the resonance frequency of the resonant circuit 16 is made lower. Therefore, the transitions of the delayed clock signal CLd32 move progressively to the later side of the data eye. When the extracting timing moves to the desired timing, the counter/tuning control circuit 48 is prevented from further counting.

Figure 5:
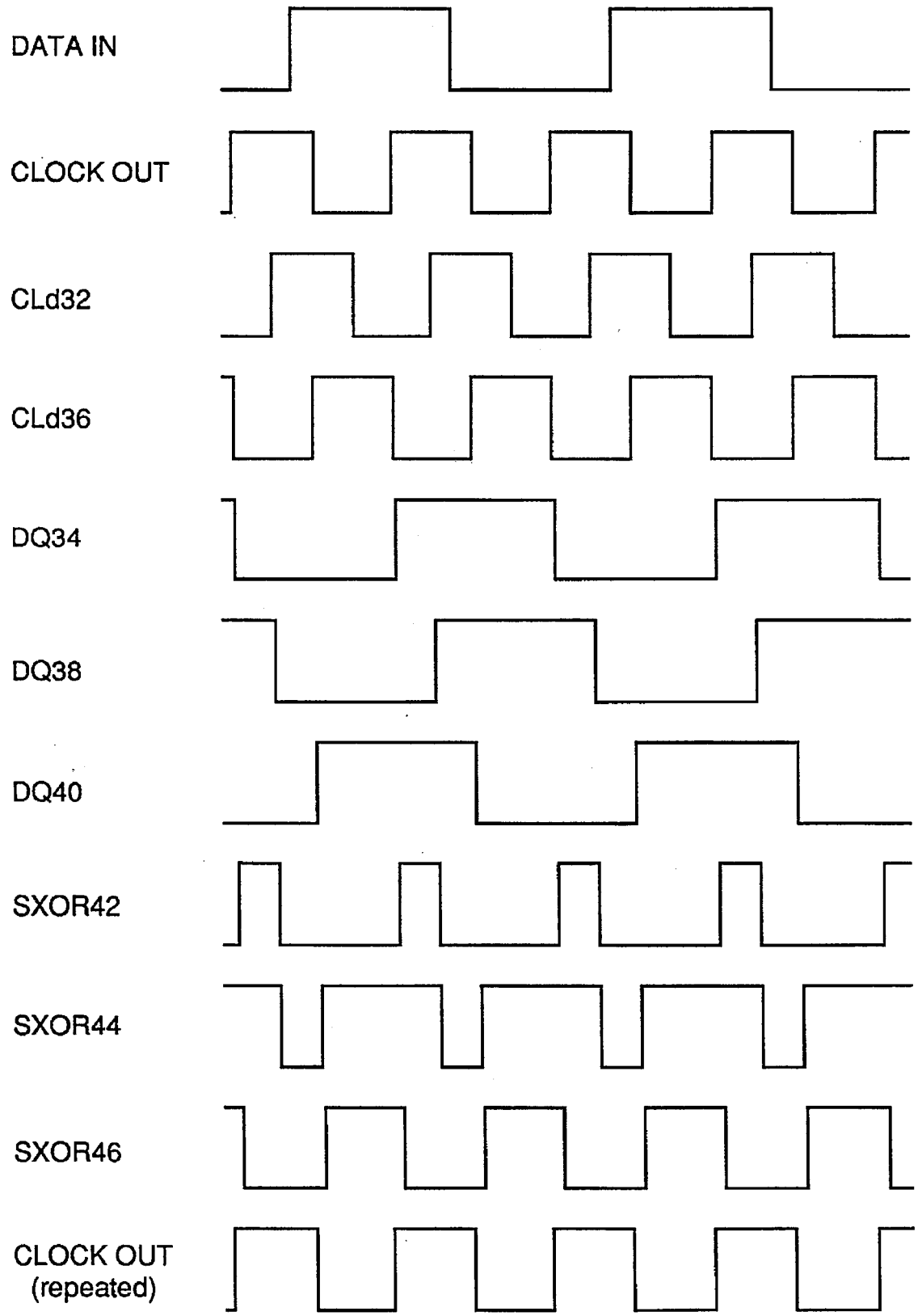
FIG. 5 is a timing chart which illustrates operation of the clock recovery circuit in a case where the clock is extracted at a delayed timing.

FIG. 5 is a timing chart which illustrates operation of the clock recovery circuit in a case where the clock is extracted at the delayed timing. In this case, the rising edge of the recovered clock signal is later than timing C shown in FIG. 2 and the extracting timing must be advanced. Because the logic state of the signal SXOR46 fed from the Exclusive OR gate 46 to the count/inhibit control terminal of the counter/tuning control circuit 48 is "high" at the rising edge of the recovered clock signal pulses, the circuit 48 is allowed to count the recovered clock signal pulses. Because the logic state of the signal SXOR44 fed from the Exclusive OR gate 44 to the up/down control terminal of the counter/tuning control circuit 48 is "high" at the rising edge of the recovered clock signal pulses, the circuit 48 counts up. In response to the output signal from the circuit 48, the D/A converter 52 produces a higher output voltage. The capacitance of the varactor diode 22 is decreased and the resonance frequency of the resonant circuit 16 is made higher. Therefore, the transitions of the delayed clock signal CLd32 move progressively to the earlier timing side of the data eye. When the extracting timing moves to the desired timing, the counter/tuning control circuit 48 is prevented from further counting.

In this embodiment, the delay circuits 32 and 36, the D flip-flops 34, 38 and 40 and the Exclusive OR gates 42, 44 and 46 determine whether or not the extracting timing is correct, advanced or delayed. In response to the determination, the tuning frequency of the resonant circuit 16 is adjusted by the counter/tuning control circuit 48, so that the extracting of the data is timed to fall in the data eye. Because the counter/tuning control circuit 48 is a 20-bit counter, the state of the eight most-significant bits is effectively an average of a large number of data samples. This reduces the effect of data jitter caused by noise bursts. Using many bits in the counter provides the best centering in the presence of noise, but increases the time required for adjustment. Using fewer bits improves the speed of adjustment at the expense of noise immunity.

Because the D/A converter 52 continuously provides the voltage signal to the varactor diode 22, although the incoming data signal on the incoming data line 10 is a sequence of consecutive binary 0s or 1s, the resonant circuit 16 continues oscillation at a constant frequency. Therefore, the recovered clock signal on the clock output line 30 will not move progressively to either side of the data eye and therefore, clock jitter is not caused. If the adjustment is correct, then a moderately long string of 1s and 0s will not cause clock jitter, because the free-running period of the resonant circuit is exactly equal to the bit rate of the incoming signal, causing all clock transitions to occur at the correct time. If the incoming signal disappears for a long period of time, as for instance occurs when the transmitter, which is connected to the clock recovery circuit, shuts down, the correct tuning already achieved will not be lost, because the state of the counter does not change. When the data signal reappears, the resonant circuit is already set to the correct frequency, it will generate clock signals with the correct timing as soon as enough transitions occur to allow the amplitude of oscillation to build up sufficiently. Typically, this occurs after several transitions. Thus, large amounts of data are not lost.

Although particular embodiments of the present invention have been described in detail, it should be appreciated that numerous variations, modifications, and adaptations may be made without departing from the scope of the present invention as defined in the claims.

What is claimed is:

1. A clock recovery circuit for recovering clock from an incoming signal in which binary data bits are clocked at a clock signal, the clock recovery circuit comprising:

means for providing a digital signal in response to the incoming signal, the frequency of said digital signal being the clock frequency;

a resonant circuit for oscillation at a variable frequency in response to said digital signal;

output means, coupled to said resonant circuit, for deriving a clock output signal from said resonant circuit; and control means for controlling the oscillation frequency of said resonant circuit, thereby making the oscillation frequency higher or lower in a case where the clock output signal is delayed or advanced with reference to a desired timing.

2. The clock recovery circuit of claim 1, wherein said resonant circuit includes an inductance element and a variable capacitance element, the capacitance of which is varied in response to an input voltage.

3. The clock recovery circuit of claim 1, wherein said control means includes:

means for determining whether or not the clock output signal is delayed or advanced with reference to the desired timing to provide an indication of delay or advance; and frequency control means for making the oscillation frequency of said resonant circuit higher or lower in response to the indication of delay or advance.

4. The clock recovery circuit of claim 3, wherein said means for determining includes:

means for providing three predetermined timings which relate to the desired timing, an advanced timing and a delayed timing; and means for judging a desired timing, an advanced timing or a delayed timing.

5. The clock recovery circuit of claim 3, wherein said frequency control means includes counting means for counting the clock pulses of the clock output signal upwardly or downwardly in response to the delay or advance of the indication and for not counting in response to the desired timing.

6. The clock recovery circuit of claim 5, wherein said means for counting does not count in a case where no incoming signal is present.

7. The clock recovery circuit of claim 5, wherein said frequency control means further includes means for generating a control voltage in response to the count of said means for counting.

8. The clock recovery circuit of claim 7, wherein said means for generating a control voltage includes means for maintaining the control voltage, so that correct adjustment, once achieved, is maintained, in a case where the incoming signal is removed.

* * * * *